May 7, 1946.  L. H. HILLS ET AL  2,399,804
METHOD OF SECURING ELASTOMERIC FILMS TO SHEET MATERIAL
Filed Dec. 9, 1942
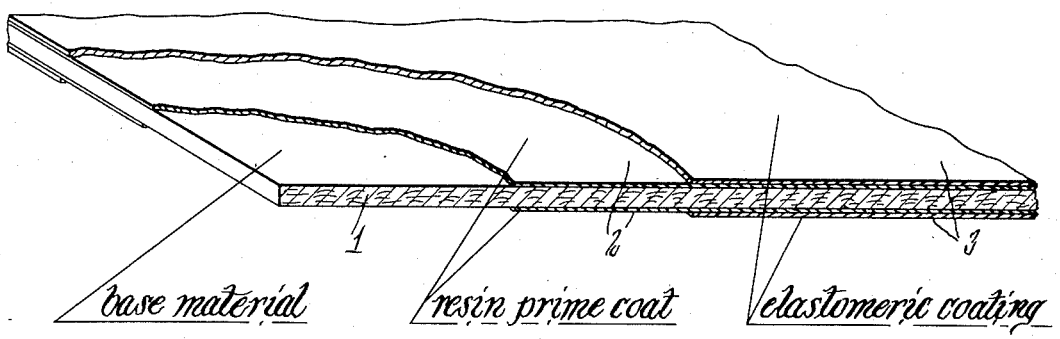
Inventors
Leander H. Hills
Alexander L. Gordon Patented May 7, 1946

2,399,804

UNITED STATES PATENT OFFICE 2,399,804

METHOD OF SECURING ELASTOMERIC FILMS TO SHEET MATERIAL

Leander H. Hills and Alexander L. Gordon, Worcester, Mass., assignors to The Vellumoid Company, Worcester, Mass., a corporation of Massachusetts Application December 9, 1942, Serial No. 468,432

4 Claims. (Cl. 117—155)

In order to provide a surface which is readily sealable to adjacent parts, as, for example, for gaskets, it is often desirable to apply a thin layer or film of elastomeric material to the sealing surface. When the base material which it is desired to so surface presents a relatively rough absorptive face, a coating of such elastomeric material may be readily so applied that an excellent bond with the base material is obtained. However, in the case of smooth surfaced, dense materials, the bond between the coating and base material may be so poor that the coating may be peeled off. Particularly in the case of gasket material, this condition gives rise to several undesirable results such as (1) lifting of the coating near the edges of gaskets cut from the coated sheets during the cutting operation by the suction cups of automatic feed devices on the presses and by the blade of the cutting die as it is withdrawn from the stock after the cut has been made; (2) de-lamination during stripping and other handling, both prior and subsequent to the cutting operation; (3) separation of the coating from the base material in service upon disassembly of flanges between which the gasket is placed and caused by the relatively better adhesion of the coating to the flange surfaces than to the base material.

This invention, therefore, has for an object to so improve the bond between the coating and smooth surfaced base material that the undesirable results such as those hereinbefore mentioned do not occur.

In general, gaskets of the type mentioned are commonly desirable in situations where petroleum products or solvents are to be handled, and commonly, also, under conditions of high pressure and at least somewhat elevated temperatures. The elastomeric coating materials most suitable for such services are certain synthetic rubbers, such as those now manufactured and sold under the trade names "Neoprene" and "Thiokol" and which may be purchased in the form of dispersions. Thiokol (type FA) has been found very satisfactory. "Thiokol" is defined as the reaction product of organic dihalides with soluble inorganic polysulfides. "Neoprene" is defined as polychloroprene rubber.

Where resistance to oils is not a requirement of the coating, natural rubber may be used, but where this is so used, it is, of course, necessary that the rubber be vulcanized on the gasket material.

The usual dispersions of the synthetic rubber contain 13% to 15% of non-volatile constituents and may be applied to the gasket or sheet by dip coating at room temperature. After approximately one hour, at a temperature of 90° F. to 120° F. to allow evaporation of the dispersing medium, which is usually propylene dichloride, the material is cured for approximately thirty minutes at approximately 280° F. to 290° F. to convert the coating to the final elastomeric state, in which condition the maximum chemical resistance to petroleum hydrocarbons and other organic solvents obtains.

The base materials to which adhesion of such elastomeric coating is unsatisfactory are those which present a smooth, non-absorptive surface. Such materials may include hard finished newsboard, chipboard, binder board, kraft fiber sheets, compressed fiber sheets such as manila tag, jute tag, chemically vulcanized fiber sheets such as are sometimes known as fish paper, and compressed highly hydrated sheet cellulosic sheet material. All these materials may be termed "non-absorption paper board."

We have found that these elastomeric films may be made to adhere strongly to such base materials by the use of a resin. Where the gasket material is intended to be used in connection with petroleum hydrocarbons and other organic solvents, the resin must also be highly resistant to such materials, and as the elastomeric materials which are most suitable for use with such petroleum hydrocarbons and organic solvents require an elevated temperature to cause setting, the resin must also be capable of withstanding this heat, and also to withstand conditions of service which may also involve somewhat elevated temperatures. For these conditions the type of resin becomes quite restricted.

We have found that a type of synthetic resin known in the trade as Vinsol, a product of the Hercules Powder Company of Wilmington, Delaware, is eminently suited for the purpose. This resin is hard and brittle and is an extract from long leaf yellow pine tree stumps, and consists largely of highly oxidized abietic acid with relatively small amounts of resin acids, ligneous materials, polyphenols and unoxidized abietic acid. It is essentially insoluble in gasoline, petroleum oils, and hydrogenated petroleum solvents, and only partially soluble in naphtha, benzol and toluol. It may be dissolved in such volatile solvents as acetone, ethylene dichloride, propylene dichloride, methyl alcohol, and ethyl alcohol, ethyl ether, "Cellosolve," "Butyl Cellosolve," and the esters. "Vinsol" is defined as a substantially petroleum hydrocarbon insoluble pine wood resin.

Its preparation is described in Hall, Patent 2,193,026.

This resin can be used in either of two ways, either as a priming coat or by incorporating it in the synthetic rubber dispersion.

In the drawing, the figure shows this resin as applied as a priming coat to the base material. As shown in this figure, the base material 1 which presents the smooth non-absorptive surface, is first coated with a solution of the resin, applied as by brushing, knifing, or dipping to form a coating 2. When free from solvent, the elastomeric coating is then applied at 3, as by dipping or knifing. A 10% resin solution is found to give a satisfactory priming coat, though the concentration may be increased or decreased to some extent without detriment. After this priming coat has been allowed to harden, the elastomeric dispersion is then applied thereover. After being subjected to a temperature of from 90° F. to 120° F. for approximately one hour to allow evaporation of the volatile constituents, the sheet is cured for about thirty minutes at approximately 280° F. to 290° F. to permit the outer coating to set or vulcanize to the elastomeric state.

When the resin is incorporated into the coating there are several limitations on the choice of a resin. It must be compatible with the material of the coating and soluble in a solvent that is either the same as or compatible with the solvent used for the final coating material. Relatively few solvents fulfill these requirements, but one of these is propylene dichloride, which as above noted, is ordinarily used as the dispersing medium for the synthetic rubber as purchased. The resin is prepared as a 50% solution in propylene dichloride and added to the dispersion of the synthetic rubber in such an amount that there are 2.5 parts of the resin per 100 parts by weight of the non-volatile components of the synthetic rubber, in the final mixture. While the percentage is not critical, since a small decrease in the amount of the resin does not seriously affect the quality of the bond, any marked increase causes a decrease of elasticity of the cured coating. The Vinsol resin is also particularly suitable for the purpose of this invention on account of its extremely low cost and ready availability and by its use an excellent bond may be obtained between the base material and the synthetic rubber.

Gaskets may be cut from the elastomeric coated base material or from the base material itself before the coating is applied as may be found more convenient.

From the foregoing description of methods of practicing this invention, it should be evident to those skilled in the art that various modifications and changes might be made without departing from the spirit or scope of this invention.

We claim:

1. The method of making gasket material resistant to petroleum and organic solvents and provided with an elastomeric surface, which comprises adding a 50% solution in propylene dichloride of a substantially petroleum hydrocarbon insoluble pine wood resin to a dispersion with propylene dichloride of a reaction product of organic dihalides with soluble inorganic polysulfides to an amount sufficient to give 2.5 parts said resin to 100 parts of the non-volatile compound of the said reaction product, to form a coating compound, coating a smooth surfaced non-absorptive paper board with said compound, allowing the coating to dry, and then subjecting the coated material to a temperature and for a sufficient length of time to cure the coating to elastomeric state.

2. The method of making gasket material resistant to petroleum and organic solvents and provided with an elastomeric surface, which comprises adding a solution of a substantially petroleum hydrocarbon insoluble pine wood resin to a dispersion of a synthetic rubber compound selected from the group consisting of reaction products of organic dihalides with soluble inorganic polysulfides and polychloroprene rubbers which when vulcanized is highly resistant to said solvents and with which said resin is compatible to form a coating compound in which the resin is present in substantial amount not markedly greater than 2.5 parts of resin per 100 parts by weight of the non-volatile components of the synthetic rubber of said dispersion, coating a smooth surfaced non-absorptive paper board base with said compound, allowing the compound to set and then vulcanizing said composition.

3. The method in accordance with claim 2 wherein the synthetic rubber compound is polychloroprene rubber.

4. The method in accordance with claim 2 wherein the synthetic rubber compound is a reaction product of organic dihalides with soluble inorganic polysulfides.

LEANDER H. HILLS.
ALEXANDER L. GORDON.